(12) United States Patent
Tanaka (10) Patent No.: US 7,336,421 B2
(45) Date of Patent: Feb. 26, 2008

(54) OPTICAL SYSTEM WITH ANTI-REFLECTION COATING

(75) Inventor: Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/091,407

(22) Filed: Mar. 29, 2005

(65) Prior Publication Data

US 2005/0219705 A1     Oct. 6, 2005

(30) Foreign Application Priority Data

Mar. 30, 2004  (JP)  ............... 2004-099132
Jan. 20, 2005   (JP)  ............... 2005-012898

(51) Int. Cl.
   *G02B 1/10* (2006.01)
(52) U.S. Cl. .............. 359/581; 359/587; 359/588
(58) Field of Classification Search ............ 359/601, 359/581, 586, 587, 588, 739, 740
See application file for complete search history.

(56) References Cited

U.S. PATENT DOCUMENTS

| | | | |
|---|---|---|---|
| 3,617,111 A * | 11/1971 | Kawazu ............... 359/765 |
| 3,781,090 A | 12/1973 | Sumita | |
| 4,128,303 A | 12/1978 | Onoki et al. | |
| 4,457,593 A * | 7/1984 | Yokota ............... 359/739 |
| 5,193,028 A | 3/1993 | Noguchi ............. 359/581 |
| 5,993,898 A | 11/1999 | Nagatsuka ........... 427/162 |
| 6,066,401 A * | 5/2000 | Stilburn ............. 428/432 |
| 6,574,039 B1 | 6/2003 | Murata et al. ....... 359/359 |
| 2002/0105721 A1 | 8/2002 | Paul et al. .......... 359/359 |
| 2002/0191168 A1 | 12/2002 | Ishizawa et al. ...... 355/53 |
| 2003/0206282 A1 * | 11/2003 | Omura ................ 355/67 |
| 2004/0114248 A1 | 6/2004 | Hokazono et al. .... 359/603 |

FOREIGN PATENT DOCUMENTS

| | | |
|---|---|---|
| EP | 0 994 368 | 4/2000 |
| EP | 1 152 263 | 11/2001 |
| JP | 60-029701 | 2/1985 |
| JP | 6-3501 | 1/1994 |
| JP | 10-221502 | 8/1998 |
| JP | 2000-249820 | 9/2000 |
| JP | 2000-356704 | 12/2000 |
| JP | 2000-357654 | 12/2000 |
| JP | 2002-311204 | 10/2002 |
| JP | 2004-302113 | 10/2004 |
| JP | 2005-114881 | 4/2005 |

OTHER PUBLICATIONS

Joosten et al., "Optical thin layers of MgF2 produced by decomposition of organic magnesium-fluoro compounds," *Applied Optics*, vol. 24, No. 16, pp. 2674-2678 (1985).

* cited by examiner

*Primary Examiner*—Alessandro Amari
(74) *Attorney, Agent, or Firm*—Miles & Stockbridge P.C.

(57) ABSTRACT

In an imaging optical system, which comprises a plurality of optical members and an aperture diaphragm, an anti-reflection coating is provided selectively on one or more surfaces of light-transmitting members that are concave with respect to the aperture diaphragm. The anti-reflection coating includes at least one layer made by a sol-gel method.

32 Claims, 6 Drawing Sheets

OPTICAL SYSTEM WITH ANTI-REFLECTION COATING

INCORPORATION BY REFERENCE

The disclosures of the following priority applications are herein incorporated by reference:

Japanese Patent Applications No. 2004-099132 filed on Mar. 30, 2004 and No. 2005-012898 filed on Jan. 20, 2005.

FIELD OF THE INVENTION

The present invention generally relates to an optical system with an anti-reflection coating provided on an optical element, the optical system being applicable for a plurality of wavelengths or bandwidths, for example, in a camera, a binocular, a telescope, a microscope and the like.

BACKGROUND OF THE INVENTION

Anti-reflection coating is provided to reduce the reflection that occurs from the difference in refractive index between the media of optical elements that are incorporated in an optical system. If such reflected light rays are allowed to reach the image plane, then a ghost or a flare can appear, severely degrading the optical performance of the system. In recent years, optical systems have been required of increasingly higher optical performance, so the anti-reflection coating provided on optical elements in an optical system is likewise required to provide increasingly lower degrees of reflection in a range of incident angles wider than ever before.

To meet such demands, progress has been made in the field of multilayer-film design technique, where various materials and film thicknesses are applied in combination, as well as in the field of multilayer coating technique (for example, refer to Japanese Laid-Open Patent Publication No. 2000-356704).

However, there has been a problem in the prior-art anti-reflection coating. If the angle of light rays incident to an optical surface where anti-reflection coating is provided increases greatly, the light rays entering obliquely, then this condition causes a rapid change in the property of the anti-reflection coating and abruptly weakens the effectiveness of the anti-reflection coating. As a result, there is an increase in the amount of light reflected. In a case where such a reflective surface exists singularly in an optical system, the reflected light is directed toward an object being observed through the system, so the above-mentioned problem does not affect directly the optical performance of the system. However, if such surfaces exist in plurality, then the system can experience at high probability a ghost or a flare, which is caused by the reflected light reaching the image. Nowadays, lenses are fabricated to have large diameters, and this manufacturing trend contributes to increases in the angular range of light rays that are incident to optical elements. As a result, optical systems are now prone to experience ghosts and flares.

SUMMARY OF THE INVENTION

In consideration of the above mentioned problem, it is an object of the present invention to provide an optical system with an anti-reflection coating that realizes low reflection for a wide range of incident angles in the visible light range.

To solve the above mentioned problem, an optical system according to a first aspect of the present invention comprises at least a light-transmitting member and an aperture diaphragm, the light-transmitting member having a concave optical surface. In this optical system, an anti-reflection coating is provided on at least one of the optical surfaces that are concave with respect to the aperture diaphragm. This anti-reflection coating is a special anti-reflection coating that comprises at least one or more layers formed by a sol-gel method.

Also, an optical system according to a second aspect of the present invention comprises at least a light-transmitting member and an aperture diaphragm, the light-transmitting member having a concave optical surface. In this optical system, an anti-reflection coating is provided on at least one of the optical surfaces that are concave with respect to the aperture diaphragm. This anti-reflection coating is a special anti-reflection coating that comprises at least one or more layers whose refractive indices are equal to or smaller than 1.3 (for example, the fourth layer $1d$ described in the following embodiment).

It is preferable that the optical system according to the first and second aspects of the present invention satisfy the following formula:

$$0 \leq f/rs < 10.0$$

wherein "f" is a focal length, and "rs" is a radius of curvature for the optical surface with the special anti-reflection coating, "rs" having a positive value (rs>0) if the optical surface is concave with respect to the aperture diaphragm.

It is also preferable that, for light rays in a wavelength range from 400 nm to 700 nm, the optical surface where the special anti-reflection coating is provided have a reflectance of 0.5% or less if the light rays are incident at angles within a range from 0 to 25 degrees, and a reflectance of 3.5% or less if the light rays are incident at angles within a range from 0 to 60 degrees.

Furthermore, the optical system according to the first and second aspects of the present invention preferably comprises a light-transmitting member whose refractive index is approximately 1.52 and which is provided with a special anti-reflection coating that includes a first layer, a second layer, a third layer and a fourth layer. In this case, the first layer is formed on an optical surface of the light-transmitting member, and it has a refractive index of approximately 1.65 and an optical film thickness of approximately 0.27λ, "λ" representing a reference light-ray wavelength of 550 nm. The second layer is formed on the first layer, and it has a refractive index of approximately 2.12 and an optical film thickness of approximately 0.07λ. The third layer is formed on the second layer, and it has a refractive index of approximately 1.65 and an optical film thickness of approximately 0.30λ. The fourth layer is formed on the third layer, and it has a refractive index of approximately 1.25 and an optical film thickness of approximately 0.26λ.

In this case, preferably, the first layer is made from aluminum oxide by a vacuum deposition, the second layer is made from a mixture of titanium oxide and zirconium oxide also by a vacuum deposition, the third layer is made from aluminum oxide also by a vacuum deposition, and the fourth layer is made from magnesium fluoride by a sol-gel method.

Furthermore, it is preferable that the optical system according to the first and second aspects of the present invention be used for light rays in a wavelength range from 400 nm to 700 nm.

Moreover, it is preferable that the optical system be used as an imaging optical system or a viewing optical system.

The optical system according to the first and second aspects of the present invention, comprising the above-described special anti-reflection coating, achieves a low reflectance for light rays in the visible light range (400 nm~700 nm in wavelength) incident in a wide range of angles (0~60 deg). As a result, the present invention can reduce the occurrence of ghost and flare.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Now, preferred embodiments according to the present invention are described in reference to the drawings. Firstly, a special anti-reflection coating (hereinafter referred to as "anti-reflection coating 1") used in the embodiments according to the present invention is described in reference to FIG. 1. The anti-reflection coating 1 comprises four layers, which are formed on an optical surface of a light-transmitting member (optical member 2). A first layer 1a, which is made from aluminum oxide, is coated on the optical member 2 by a vacuum deposition, and a second layer 1b, which is made from a mixture of titanium oxide and zirconium oxide, is coated on the first layer 1a also by a vacuum deposition. Furthermore, a third layer 1c, which is made from aluminum oxide, is coated on the second layer 1b also by a vacuum deposition, and a fourth layer 1d, which is made from magnesium fluoride, is coated on the third layer 1c by a sol-gel method. As a result, these four layers together constitute the anti-reflection coating 1 as a first embodiment. Here, the sol-gel method is a processing in which a film is formed on an optical surface of an optical member by applying a sol of a film-forming material and by letting a gel film deposit, and then by dipping the film into a liquid, which is evaporated in a critical state at a critical temperature and a critical pressure to dry the film.

Figure 1:
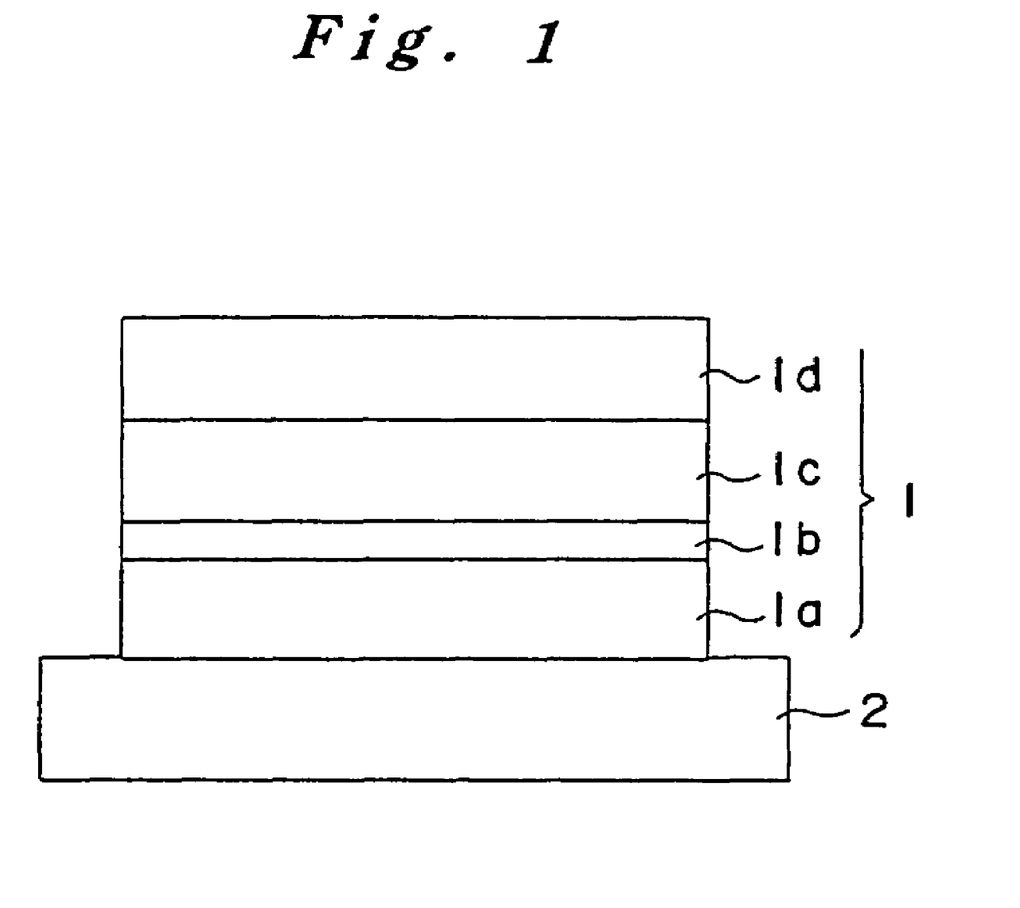
FIG. 1 shows the structure of an anti-reflection coating according to the present invention.

In this way, the first through third layers 1a~1c of the anti-reflection coating 1 are coated by electron-beam evaporation, which is a dry process. However, the fourth layer 1d, which is the uppermost layer, is coated by the following procedure, which is a wet process that uses a sol prepared by a process that uses hydrofluoric acid and magnesium acetate (this process is hereinafter referred to also as "hydrofluoric acid and magnesium acetate method"). Beforehand, the surface of the lens to be coated by this procedure (the above-mentioned optical surface of the optical member 2) is coated successively with an aluminum oxide layer as the first layer 1a, a titanium oxide and zirconium oxide mixed layer as the second layer 1b and an aluminum oxide as the third layer 1c by using a vacuum metallizer. After the optical member 2 is taken out of the vacuum metallizer, the surface of the lens is spin-coated with a sol prepared by a hydrofluoric acid and magnesium acetate method to form a magnesium fluoride layer as the fourth layer 1d. The following formula (1) is the reaction formula of the hydrofluoric acid and magnesium acetate method.

$$2HF+Mg(CH_3COO)_2 \rightarrow MgF_2+2CH_3COOH \quad (1)$$

As a sol to be used for the coating, raw materials are mixed and then aged at a high pressure and a high temperature for 24 hours in an autoclave before being applied in the coating. After the optical member 2 is coated with the fourth layer 1d, it is heated at 150 deg C. for an hour in the atmosphere to complete the layer. In the sol-gel method, atoms or molecules gather into particles, each particle comprising a few atoms or molecules to tens of atoms or molecules, and the sizes of the particles range from a few nanometers to tens of nanometers. Furthermore, these particles gather into secondary particles, each secondary particle comprising a few original particles, and then these secondary particles deposit to form the fourth layer 1d.

Figure 2:
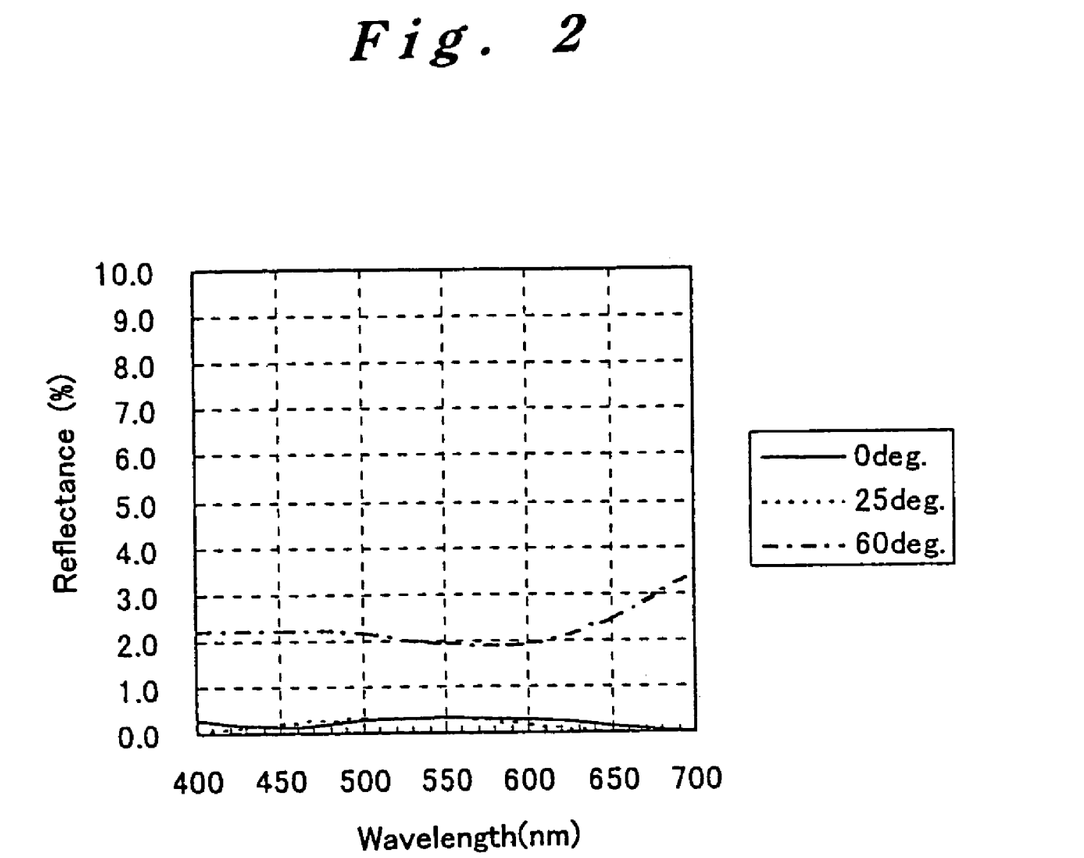
FIG. 2 is a graph, which shows the spectral characteristics of the anti-reflection coating according to the present invention.

Now, the optical performance of the anti-reflection coating 1, which is formed in the above described way, is explained in reference to FIG. 2, which shows the spectral characteristics of the optical member 2 having a refractive index of 1.52 for a reference wavelength $\lambda$ of 550 nm. Specifically, in this case, the refractive index of the first layer 1a having an optical film thickness of $0.27\lambda$ is 1.65; the refractive index of the second layer 1b having an optical film thickness of $0.07\lambda$ is 2.12; the refractive index of the third layer 1c having an optical film thickness of $0.30\lambda$ is 1.65; and the refractive index of the fourth layer 1d having an optical film thickness of $0.26\lambda$ is 1.25. It is clear from FIG. 2 that the anti-reflection coating 1 achieves substantially low reflectances for light rays in the visible light range (400 nm~700 nm in wavelength). For example, the reflectance is below 3.5% even at an incident angle of 60 degrees while it is below 0.5% in a range from 0 to 25 degrees. Furthermore, the reflectance is stable either to the short wave side (near 400 nm) or to the long wave side (near 700 nm) from the reference wavelength $\lambda$, so the anti-reflection coating demonstrates a uniform effect in a wavelength range from 400 nm to 700 nm.

In the following embodiments, the anti-reflection coating 1 is provided on an optical surface of a lens which surface is non-convex (planar or concave) with respect to an aperture diaphragm.

If the focal length of an optical system that has such an optical surface is designated with "f", and if the radius of curvature of an optical surface that has the anti-reflection coating 1 is designated with "rs", then the following conditional expression (2) is satisfied. In this conditional expression (2), the value of the radius of curvature rs is positive (rs>0) if the curvature is concave with respect to the aperture diaphragm.

$$0 \leq f/rs < 10.0 \tag{2}$$

The above conditional expression (2) describes an optimal range for the radius of curvature rs of the optical surface that has an anti-reflection coating 1, against the focal length of the optical system. If the ratio exceeds the lower limit, then the optical surface becomes convex with respect to the aperture diaphragm. In this case, as this surface is unlikely to cause a ghost, even if an anti-reflection coating were provided on such a surface, the anti-reflective effect would not be demonstrated. On the other hand, if the ratio exceeds the upper limit, then the radius of curvature is too small for the optical surface to cause a ghost. In this case, also, the anti-reflective effect would not be demonstrated. Therefore, to secure the effectiveness of the present invention, preferably, the upper limit of the conditional expression (2) is set at 6.0. More preferably, the upper limit is set at 5.0, and most preferably, it is set at 3.5. On the other hand, it is preferable that the lower limit of the conditional expression (2) does not include 0.

Embodiment 1

Figure 3:
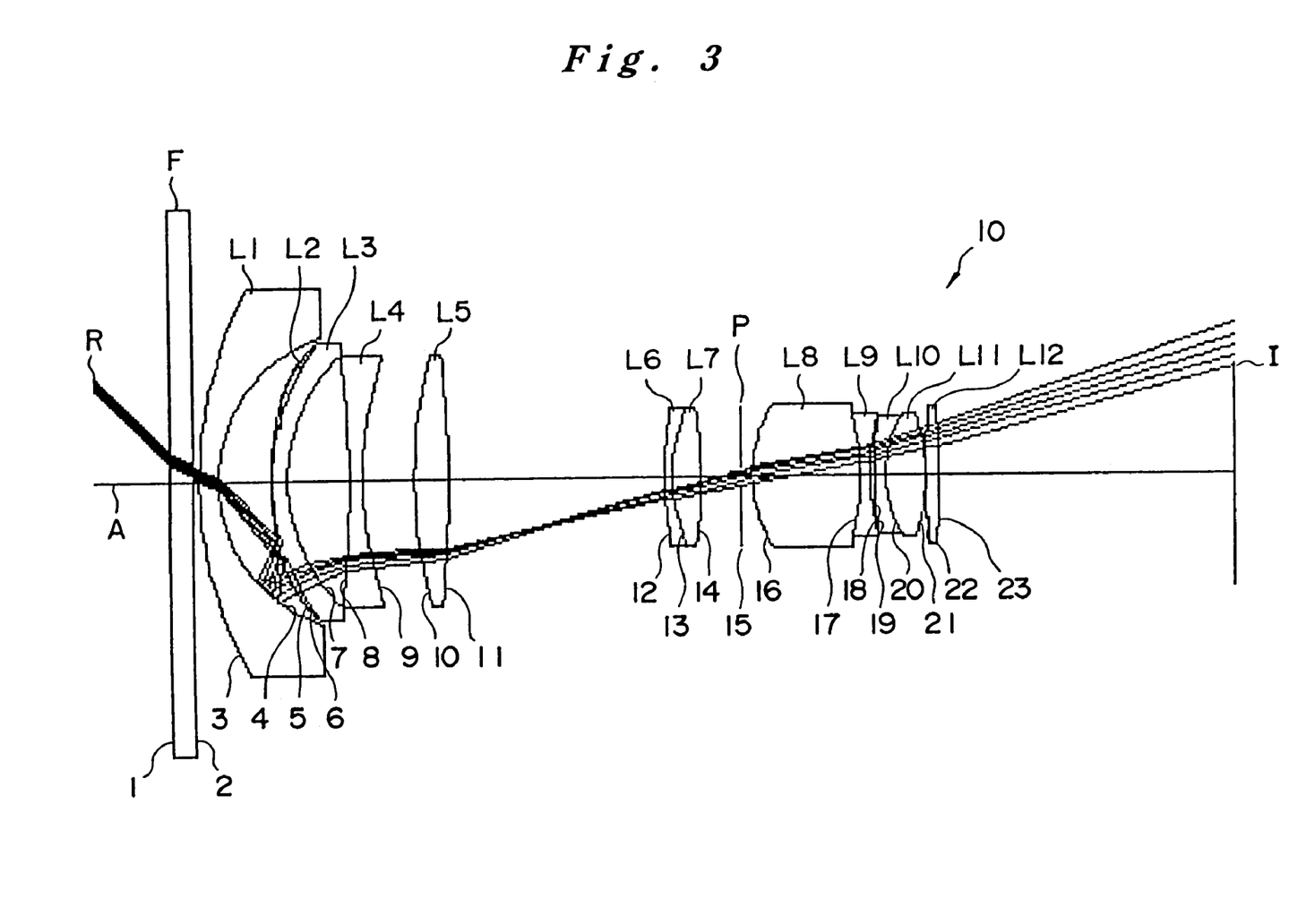
FIG. 3 is the lens arrangement of an imaging optical system, which includes optical elements with the anti-reflection coating as a first embodiment according to the present invention.

Now, an imaging optical system 10, which includes an optical element with the above described anti-reflection coating, is described as a first embodiment in reference to FIG. 3. The imaging optical system 10 is to be used as a zoom lens for a camera, which provides continuously variable focal lengths from 18 mm to 35 mm. For imaging an object on an image plane I, the imaging optical system 10 comprises, in aligned order from the side facing the object, a plane-parallel plate F as a protective glass, a negative meniscus lens L1, which is convex to the side of the object, a cemented lens that includes a negative meniscus lens L2 and a negative meniscus lens L3 cemented together with their convexities facing toward the object, a biconcave lens L4, a biconvex lens L5, a cemented lens that includes a negative meniscus lens L6 and a biconvex lens L7 cemented together with the convexity of the meniscus lens L6 facing toward the object, an aperture diaphragm P, a cemented lens that includes a biconvex lens L8 and a biconcave lens L9 cemented together, a cemented lens that includes a negative meniscus lens L10 and a biconvex lens L11 cemented together with the convexity of the meniscus lens L10 facing toward the object, and a biconvex lens L12. It should be noted here that, in the imaging optical system 10, the surface (surface number 3) of the negative meniscus lens L2 facing to the object is an aspherical surface.

The shape of the aspherical surface is defined by the following equation (3), where "y" is the height in the direction perpendicular to the optical axis, "x(y)" is the distance along the optical axis from the plane tangent to the vertex of the aspherical surface to a point at the height y on the aspherical surface, "r" is the paraxial radius of curvature (the radius of curvature of the datum sphere), "k" is a conic section constant, and "$C_n$" is the n-th aspherical coefficient.

$$x(y) = (y^2/r)/(1+(1-k(y^2/r^2))^{1/2}) + C_4 y^4 + C_6 y^6 + C_8 y^8 + C_{10} y^{10} \tag{3}$$

Table 1 below lists the properties of the lenses of the imaging optical system 10 as the first embodiment. Surface numbers 1~23 in Table 1 correspond to numerals 1~23 in FIG. 3, which describes the imaging optical system 10. Respectively, "r" in Table 1 is the radius of curvature of each lens surface, and "d" is the distance between the lens surface to the next lens surface in the order. Also, "vd" is the Abbe constant for the d line, "nd" is the refractive index for the d line, "f" is the focal length, and "Bf" is the back focus. The units of the values for the focal length f, the radius of curvature r, the surface distance d and the like listed below are "mm" unless mentioned otherwise. However, the units are not limited to "mm", and other appropriate units can be applied since any optical system displays an equivalent optical performance as it is enlarged or contracted proportionally. Furthermore, in the values of the aspherical coefficients $C_n$ (n=4, 6, 8, 10), the notation "E-##" represents "x $10^{-\#\#}$" (for example, "E-09" represents "x $10^{-9}$"). In Table 1 below, the surfaces that are not spherical are marked with "*" next to the corresponding surface numbers. These comments are also applicable to the other embodiments that follow.

TABLE 1 f = 18.500
Bf = 38.272

| Surface number | r | d | vd | nd | |
|---|---|---|---|---|---|
| 1 | ∞ | 3.000 | 64.1 | 1.51680 | F |
| 2 | ∞ | 2.500 | | 1.00000 | |
| 3 | 50.76 | 2.500 | 45.3 | 1.79500 | L1 |
| 4 | 19.41 | 7.000 | | 1.00000 | |
| 5* | 44.27 | 0.100 | 55.6 | 1.50625 | L2 |
| 6 | 28.81 | 2.000 | 45.3 | 1.79500 | L3 |
| 7 | 22.20 | 8.200 | | 1.00000 | |
| 8 | −121.57 | 1.700 | 44.8 | 1.74400 | L4 |
| 9 | 49.85 | 6.800 | | 1.00000 | |
| 10 | 58.05 | 4.500 | 28.6 | 1.79504 | L5 |
| 11 | −149.17 | 28.422 | | 1.00000 | |
| 12 | 51.03 | 1.000 | 47.4 | 1.78800 | L6 |
| 13 | 23.03 | 3.800 | 56.4 | 1.50137 | L7 |
| 14 | −54.97 | 5.166 | | 1.00000 | |
| 15 | ∞ | 1.500 | 8.6 | 1.00000 | P |
| 16 | 17.65 | 14.200 | 59.5 | 1.53996 | L8 |
| 17 | −27.28 | 1.300 | 45.3 | 1.79500 | L9 |
| 18 | 32.29 | 0.700 | | 1.00000 | |
| 19 | 110.45 | 1.300 | 37.4 | 1.83400 | L10 |
| 20 | 14.03 | 5.300 | 82.5 | 1.49782 | L11 |
| 21 | −23.36 | 0.100 | | 1.00000 | |
| 22 | 138.28 | 1.600 | 59.5 | 1.53996 | L12 |
| 23 | −138.28 | | | 1.00000 | |

(Data for the aspherical surfaces)
Surface number 5 k = 5.435
C4 = 7.1876E−06      C6, = −3.6412E−09
C8 = 3.9918E−11      C10 = −3.3225E−14

As shown in FIG. 3, if a light ray R from the side of the object enters the imaging optical system 10 at an incident angle of 45 degrees, which is the angle between the light ray R and the optical axis A, then the light ray reflects at the object-side surface of the negative meniscus lens L2 (first ghost-generating surface with surface number 5). This reflected light reflects again at the image-side surface of the negative meniscus lens L1 (second ghost-generating surface with surface number 4), and then it reaches the image plane I to generate a ghost. In the first embodiment, the aperture diaphragm P is contracted to the size equivalent to F-number 22, F-number being an indicator of lens brightness. The inventor has found that the surfaces of the light-transmitting members (i.e., the lenses) that are concave with respect to the diaphragm (iris) of the optical system are ghost-generating surfaces. The first ghost-generating surface 5 and the second ghost-generating surface 4 both have concavities with respect to the aperture diaphragm P. Therefore, if the anti-reflection coating 1, which is effective for light rays in a wide range of wavelengths entering in a wide range of angles, is provided on these surfaces, respectively, the ghost of the imaging optical system 10 can be reduced effectively.

Embodiment 2

Figure 4:
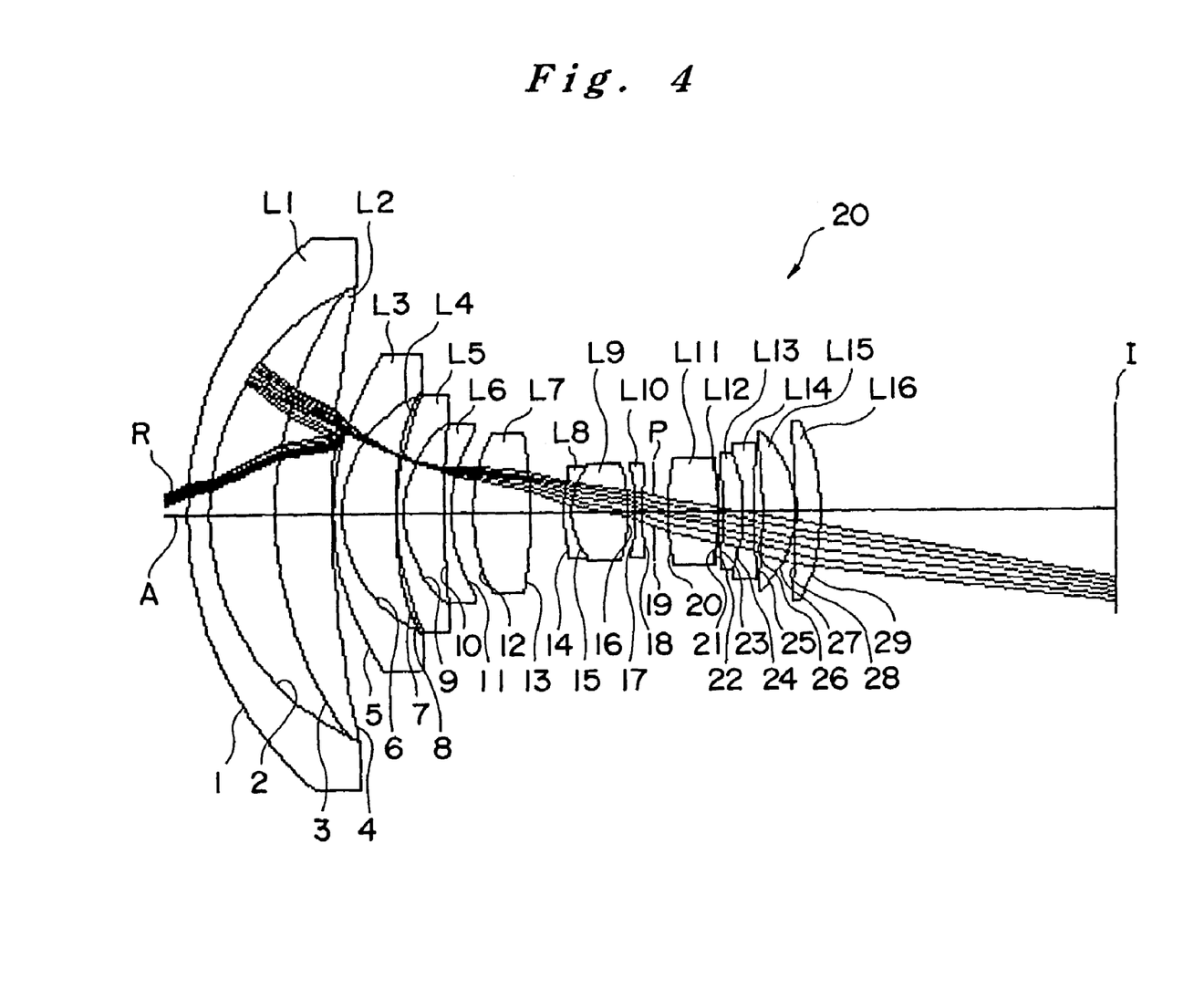
FIG. 4 is the lens arrangement of an imaging optical system, which includes optical elements with the anti-reflection coating as a second embodiment according to the present invention.

FIG. 4 shows an imaging optical system 20 as a second embodiment according to the present invention. The imaging optical system 20 is to be used as a camera lens, whose focal length is 14 mm. For imaging an object on an image plane I, the imaging optical system 20 comprises, in aligned order from the side facing the object, a negative meniscus lens L1, whose convexity is directed toward the object, a positive meniscus lens L2, whose convexity is directed also toward the object, a negative meniscus lens L3, whose convexity is directed also toward the object, a cemented lens that includes a negative meniscus lens L4 and a negative meniscus lens L5 cemented together with their convexities facing toward the object, a negative meniscus lens L6, whose convexity is directed also toward the object, a biconvex lens L7, a cemented lens that includes a negative meniscus lens L8 and a biconvex lens L9 cemented together with the convexity of the meniscus lens L8 facing toward the object, a biconcave lens L10, an aperture diaphragm P, a cemented lens that includes a biconvex lens L11 and a meniscus lens L12 cemented together with the concavity of the meniscus lens L12 facing toward the object, a cemented lens that includes a positive meniscus lens L13 and a biconcave lens L14 cemented together with the concavity of the meniscus lens L13 facing toward the object, a positive meniscus lens L15, whose concavity is directed toward the object, and a positive meniscus lens L16, whose concavity is directed also toward the object. In the imaging optical system 20, the surface (surface number 7) of the negative meniscus lens L4 facing to the object and that (surface number 22) of the meniscus lens L12 facing to the image are aspherical surfaces.

Table 2 below lists the properties of the lenses of the imaging optical system 20 as the second embodiment. Surface numbers 1~29 in Table 2 correspond to numerals 1~29 in FIG. 4, which describes the imaging optical system 20.

TABLE 2 f = 14.286
Bf = 40.856

| Surface number | r | d | vd | nd | |
|---|---|---|---|---|---|
| 1 | 50.00 | 3.000 | 37.2 | 1.83400 | L1 |
| 2 | 34.00 | 9.200 | | 1.00000 | |
| 3 | 51.90 | 8.000 | 50.2 | 1.72000 | L2 |
| 4 | 141.60 | 0.150 | | 1.00000 | |
| 5 | 37.70 | 1.200 | 49.6 | 1.77250 | L3 |
| 6 | 17.70 | 7.500 | | 1.00000 | |
| 7* | 70.00 | 0.200 | 41.2 | 1.53610 | L4 |
| 8 | 40.00 | 1.000 | 50.2 | 1.72000 | L5 |
| 9 | 16.10 | 5.600 | | 1.00000 | |
| 10 | 150.00 | 1.000 | 55.3 | 1.67790 | L6 |

TABLE 2-continued

| 11 | 20.32 | 3.000 | | 1.00000 | |
| 12 | 24.63 | 8.000 | 35.3 | 1.59270 | L7 |
| 13 | −64.30 | 4.764 | | 1.00000 | |
| 14 | 31.80 | 1.000 | 49.6 | 1.77250 | L8 |
| 15 | 9.94 | 8.000 | 40.8 | 1.58144 | L9 |
| 16 | −19.66 | 1.000 | | 1.00000 | |
| 17 | −26.20 | 1.000 | 46.6 | 1.80400 | L10 |
| 18 | 98.00 | 1.500 | | 1.00000 | |
| 19 | ∞ | 2.000 | | 1.00000 | P |
| 20 | 37.00 | 7.000 | 47.2 | 1.54072 | L11 |
| 21 | −37.00 | 0.200 | 41.2 | 1.53610 | L12 |
| 22* | −37.00 | 0.500 | | 1.00000 | |
| 23 | −57.52 | 2.800 | 64.1 | 1.51633 | L13 |
| 24 | −21.60 | 1.500 | 25.4 | 1.80518 | L14 |
| 25 | 84.37 | 1.250 | | 1.00000 | |
| 26 | −79.70 | 4.500 | 81.6 | 1.49700 | L15 |
| 27 | −15.18 | 0.150 | | 1.00000 | |
| 28 | −108.30 | 3.500 | 65.5 | 1.60300 | L16 |
| 29 | −27.30 | | | 1.00000 | |

(Data for the aspherical surfaces)

Surface number 7 k = 1.000
$C_4$ = 2.2907E−05          $C_6$ = −3.6930E−08
$C_8$ = 7.7131E−11          $C_{10}$ = 6.4108E−14

Surface number 22 k = 1.000
$C_4$ = 4.6227E−05          $C_6$ = 3.1878E−10
$C_8$ = −2.7411E−09         $C_{10}$ = 1.9713E−11

As shown in FIG. 4, if a light ray R from the side of the object enters the imaging optical system 20 at an incident angle of 22 degrees, which is the angle between the light ray R and the optical axis A, then the light ray reflects at the object-side surface of the negative meniscus lens L3 (first ghost-generating surface with surface number 5). This reflected light reflects again at the image-side surface of the negative meniscus lens L1 (second ghost-generating surface with surface number 2), and then it reaches the image plane I to generate a ghost. In the second embodiment, the aperture diaphragm P is contracted to the size equivalent to F-number 8, F-number being an indicator of lens brightness. The first ghost-generating surface 5 and the second ghost-generating surface 2 both have concavities with respect to the aperture diaphragm P. Therefore, if the anti-reflection coating 1 is provided on these surfaces, respectively, the ghost can be prevented effectively.

Embodiment 3

Figure 5:
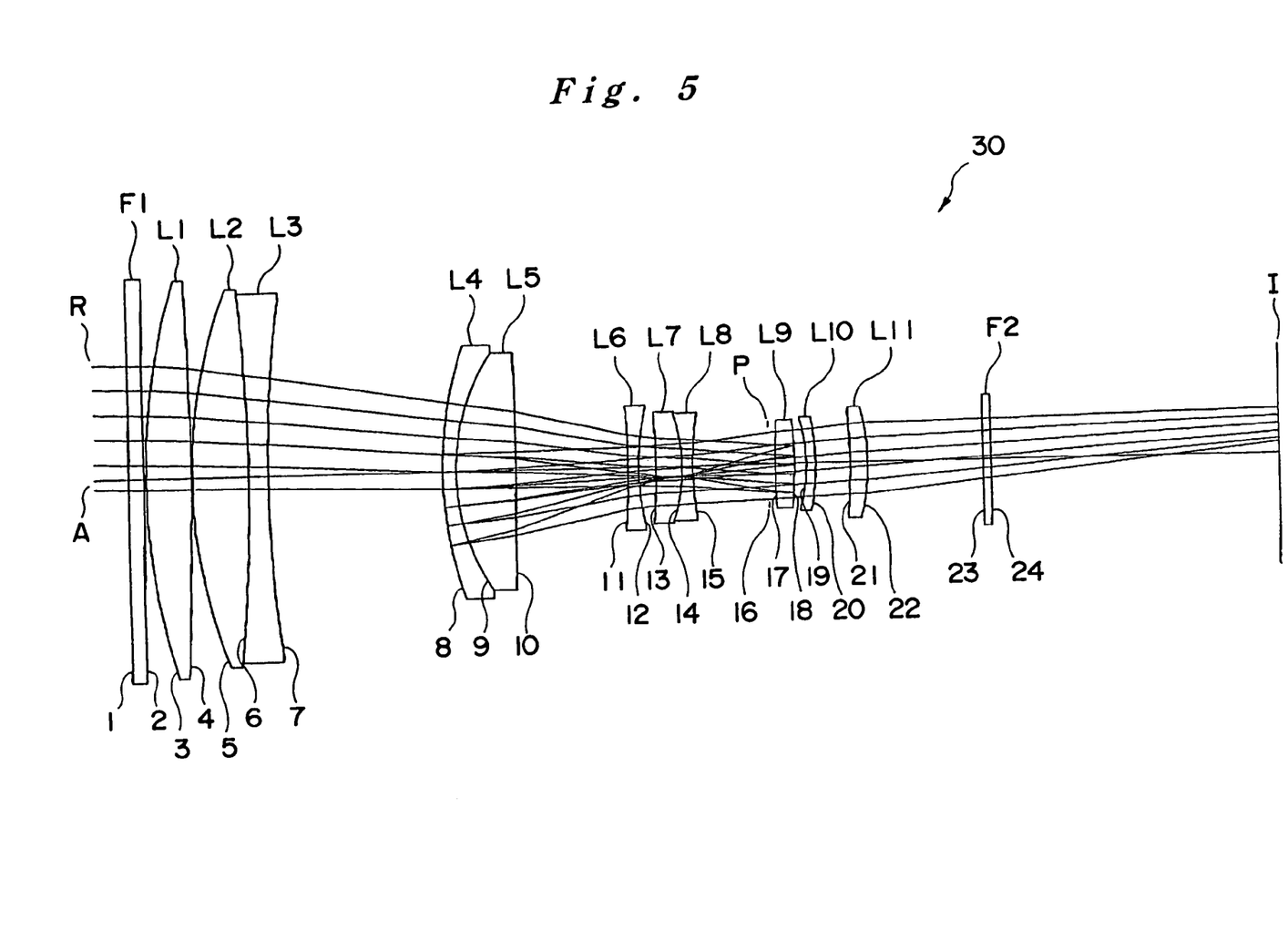
FIG. 5 is the lens arrangement of an imaging optical system, which includes optical elements with the anti-reflection coating as a third embodiment according to the present invention. In this case, incident light is reflected at a first ghost-generating surface and at a second ghost-generating surface.
Figure 6:
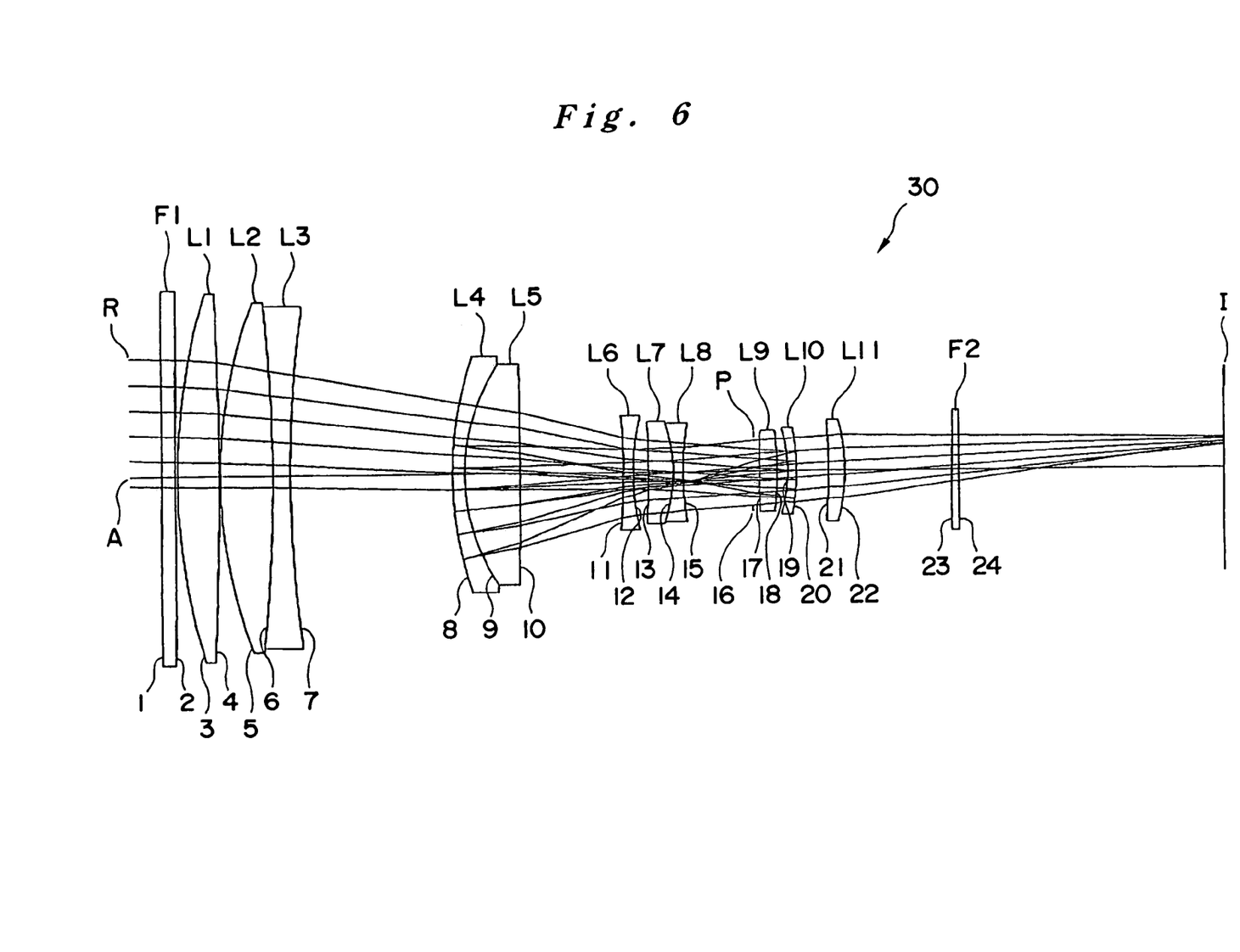
FIG. 6 is the lens arrangement of an imaging optical system, which includes optical elements with the anti-reflection coating as the third embodiment. In this case, incident light is reflected at a third ghost-generating surface and at the second ghost-generating surface.

Now, an imaging optical system 30 is described as a third embodiment of optical system, which includes an optical element with the above described anti-reflection coating 1, in reference to FIGS. 5 and 6. The imaging optical system 30 is to be used as a camera lens whose focal length is 293.798 mm. For imaging an object on an image plane I, the imaging optical system 30 comprises, in aligned order from the side facing the object, a plane-parallel plate F1 as a protective glass, a biconvex lens L1, a cemented lens that includes a biconvex lens L2 and a biconcave lens L3 cemented together, a cemented lens that includes a negative meniscus lens L4 and a biconvex lens L5 cemented together with the convexity of the meniscus lens L4 facing toward the object, a biconcave lens L6, a cemented lens that includes a positive meniscus lens L7 and a biconcave lens L8 cemented together with the concavity of the meniscus lens L7 facing toward the object, an aperture diaphragm P, a biconvex lens L9, a negative meniscus lens L10 with its concavity facing toward the object, a positive meniscus lens L11 with its concavity facing toward the object and a plane-parallel plate F2 as a protective glass. Table 3 below lists the properties of the lenses of the imaging optical system 30 as the third embodiment. Surface numbers 1~24 in Table 3 correspond to numerals 1~24 in FIGS. 5 and 6, which describe the imaging optical system 30.

TABLE 3 f = 293.798
Bf = 75.053

| Surface number | r | d | vd | nd | |
|---|---|---|---|---|---|
| 1 | ∞ | 4.000 | 64.1 | 1.51680 | F |
| 2 | ∞ | 0.600 | | 1.00000 | |
| 3 | 173.87 | 12.000 | 82.5 | 1.49782 | L1 |
| 4 | −978.06 | 0.200 | | 1.00000 | |
| 5 | 134.20 | 15.000 | 82.5 | 1.49782 | L2 |
| 6 | −460.58 | 5.000 | 46.6 | 1.80400 | L3 |
| 7 | 332.91 | 46.300 | | 1.00000 | |
| 8 | 99.36 | 3.500 | 44.8 | 1.74400 | L4 |
| 9 | 55.69 | 15.900 | 82.5 | 1.49782 | L5 |
| 10 | −1333.18 | 29.707 | | 1.00000 | |
| 11 | −169.97 | 2.700 | 64.1 | 1.51680 | L6 |
| 12 | 67.28 | 4.510 | | 1.00000 | |
| 13 | −192.93 | 7.000 | 33.9 | 1.80384 | L7 |
| 14 | −43.08 | 2.800 | 61.3 | 1.58913 | L8 |
| 15 | 83.89 | 20.103 | | 1.00000 | |
| 16 | ∞ | 1.700 | | 1.00000 | P |
| 17 | 203.13 | 5.100 | 69.9 | 1.51860 | L9 |
| 18 | −99.77 | 3.057 | | 1.00000 | |
| 19 | −43.00 | 2.500 | 28.5 | 1.79504 | L10 |
| 20 | −61.85 | 9.100 | | 1.00000 | |
| 21 | −176.54 | 4.700 | 69.9 | 1.51860 | L11 |
| 22 | −53.37 | 30.600 | | 1.00000 | |
| 23 | ∞ | 2.000 | 64.1 | 1.51680 | F2 |
| 24 | ∞ | 75.053 | | 1.00000 | |

As shown in FIG. 5, if a light ray R from the side of the object enters the imaging optical system 30 at an incident angle of 2 degrees, which is the angle between the light ray R and the optical axis A, then the light ray reflects at the image-side surface of the biconvex lens L9 (first ghost-generating surface with surface number 18). This reflected light reflects again at the object-side surface of the negative meniscus lens L4 (second ghost-generating surface with surface number 8), and then it reaches the image plane I to generate a ghost. In this embodiment, the first ghost-generating surface 18 and the second ghost-generating surface 8 both have concavities with respect to the aperture diaphragm P. Therefore, if the anti-reflection coating 1 is provided on the first ghost-generating surface of these surfaces, the ghost can be prevented effectively.

Also, as shown in FIG. 6, if a light ray R from the side of the object enters the imaging optical system 30 at an incident angle of 2 degrees, which is the angle between the light ray R and the optical axis A, then the light ray reflects at the image-side surface of the biconvex lens L10 (third ghost-generating surface with surface number 20). This reflected light reflects again at the object-side surface of the negative meniscus lens L4 (the same above-mentioned second ghost-generating surface with surface number 8), and then it reaches the image plane I to generate a ghost. In this case, the third ghost-generating surface 20 and the second ghost-generating surface 8 both have concavities with respect to the aperture diaphragm P. Therefore, if the anti-reflection coating 1 is provided on the third ghost-generating surface of these surfaces, the ghost can be prevented effectively. In the third embodiment (shown in FIGS. 5 and 6), the aperture diaphragm P is contracted to the size equivalent to F-number 5.6, F-number being an indicator of lens brightness.

The above mentioned conditional expression (2) is satisfied with the values listed below for the embodiments 1~3, respectively.

(Values Satisfying the Conditional Expression (2))

| Embodiment 1 | rs = 19.41 (surface number 4) | f/rs = 0.953 |
| --- | --- | --- |
| | rs = 44.27 (surface number 5) | f/rs = 0.418 |
| Embodiment 2 | rs = 34.00 (surface number 2) | f/rs = 0.420 |
| | rs = 37.70 (surface number 5) | f/rs = 0.379 |
| Embodiment 3 | rs = 99.77 (surface number 18) | f/rs = 2.944 |
| | rs = 61.85 (surface number 20) | f/rs = 4.750 |

Moreover, even if the above mentioned imaging optical systems 10, 20 and 30 are provided with eyepieces, respectively, on the image side, so that the systems are to be used as viewing optical systems, the anti-reflection coating 1 can achieve the same effectiveness for suppressing the ghosts and flares, thus providing the systems with sharp images for viewing.

The anti-reflection coating 1 described above with the embodiments can provide an optical element with a low reflectance in a wide angular range in the visible light range (400 nm ~700 nm). By realizing such an optical element to be used in an optical system, the present invention provides an optical system with a high optical performance, which is not affected by a ghost and a flare. By forming an anti-reflection coating 1 specifically on the concave surfaces of light-transmitting elements (lenses) that face toward the aperture diaphragm P, the present invention provides a high performance optical system, which is less prone to a ghost and a flare than a prior-art optical system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical system comprising:
   an aperture diaphragm; and
   plural light-transmitting members, including a plurality of lens elements, wherein:
   at least one said light-transmitting member has an optical surface which is non-convex with respect to said aperture diaphragm;
   an anti-reflection coating is provided on said optical surface;
   said anti-reflection coating has a plurality of layers, including an upper layer formed by a sol-gel method, and at least one layer formed by vacuum deposition and located between said upper layer and said optical surface; and
   the following formula is satisfied:

$$0 \leq f/rs < 10.0$$

wherein "f" is a focal length, and "rs" is a radius of curvature for the optical surface with said anti-reflection coating, "rs" having a positive value (rs>0) if the optical surface is concave with respect to said aperture diaphragm.

2. The optical system set forth in claim 1, wherein:
   for light rays in a wavelength range from 400 nm to 700 nm, said optical surface where said anti-reflection coating is provided has:
a reflectance of 0.5% or less if said light rays are incident at angles within a range from 0 to 25 degrees, and
a reflectance of 3.5% or less if said light rays are incident at angles within a range from above 25 degrees to 60 degrees.

3. The optical system set forth in claim 1, wherein:
said light-transmitting member has refractive index of approximately 1.52, and said anti-reflection coating comprises:
a first layer, which is formed on said optical surface of said light-transmitting member, said first layer having a refractive index of approximately 1.65 and an optical film thickness of approximately $0.27\lambda$;
a second layer, which is formed on said first layer, said second layer having a refractive index of approximately 2.12 and an optical film thickness of approximately $0.07\lambda$;
a third layer, which is formed on said second layer, said third layer having a refractive index of approximately 1.65 and an optical film thickness of approximately $0.30\lambda$; and
a fourth layer, which is formed on said third layer, said fourth layer having a refractive index of approximately 1.25 and an optical film thickness of approximately $0.26\lambda$,
"$\lambda$" being a reference light-ray wavelength of 550 nm.

4. The optical system set forth in claim 3, wherein:
said first layer is made from aluminum oxide by vacuum deposition;
said second layer is made from a mixture of titanium oxide and zirconium oxide by vacuum deposition;
said third layer is made from aluminum oxide by vacuum deposition; and
said fourth layer is made from magnesium fluoride by a sol-gel method.

5. The optical system set forth in claim 1 to be used for light rays in a wavelength range from 400 nm to 700 nm.

6. The optical system set forth in claim 1, and which is an imaging optical system.

7. The optical system set forth in claim 1, and which is a viewing optical system.

8. The optical system set forth in claim 1, wherein said anti-reflection coating includes a plurality of lower layers.

9. The optical system set forth in claim 1, wherein said optical surface is concave with respect to said aperture diaphragm.

10. An optical system comprising:
an aperture diaphragm; and
plural light-transmitting members, including a plurality of lens elements, wherein:
at least one said light-transmitting member has an optical surface which is non-convex with respect to said aperture diaphragm;
an anti-reflection coating is provided on said optical surface;
said anti-reflection coating has a plurality of layers, including an upper layer formed by a sol-gel method, and at least one layer formed by vacuum deposition and located between said upper layer and said optical surface; and
for light rays in a wavelength range from 400 nm to 700 nm,
said optical surface where said anti-reflection coating is provided has:
a reflectance of 0.5% or less if said light rays are incident at angles within a range from 0 to 25 degrees, and
a reflectance of 3.5% or less if said light rays are incident at angles within a range from above 25 degrees to 60 degrees.

11. An optical system comprising:
an aperture diaphragm; and
plural light transmitting members, including a plurality of lens elements, wherein:
at least one said light-transmitting member has an optical surface which is non-convex with respect to said aperture diaphragm;
an anti-reflection coating is provided on said optical surface;
said anti-reflection coating has a plurality of layers, including an upper layer having a refractive index equal to or smaller than 1.3, and at least one layer formed by vacuum deposition and located between said upper layer and said optical surface; and
the following formula is satisfied:

$$0 \leq f/rs < 10.0$$

wherein "f" is a focal length, and "rs" is a radius of curvature for the optical surface with said anti-reflection coating, "rs" having a positive value (rs>0) if the optical surface is concave with respect to said aperture diaphragm.

12. The optical system set forth in claim 11, wherein:
for light rays in a wavelength range from 400 nm to 700 nm,
said optical surface where said anti-reflection coating is provided has:
a reflectance of 0.5% or less if said light rays are incident at angles within a range from 0 to 25 degrees, and
a reflectance of 3.5% or less if said light rays are incident at angles within a range from above 25 degrees to 60 degrees.

13. The optical system set forth in claim 11, wherein:
said light-transmitting member has a refractive index of approximately 1.52, and said anti-reflection coating comprises:
a first layer, which is formed on said optical surface of said light-transmitting member, said first layer having a refractive index of approximately 1.65 and an optical film thickness of approximately $0.27\lambda$;
a second layer, which is formed on said first layer, said second layer having a refractive index of approximately 2.12 and an optical film thickness of approximately $0.07\lambda$;
a third layer, which is formed on said second layer, said third layer having a refractive index of approximately 1.65 and an optical film thickness of approximately $0.30\lambda$; and
a fourth layer, which is formed on said third layer, said fourth layer having a refractive index of approximately 1.25 and an optical film thickness of approximately $0.26\lambda$,
"$\lambda$" being a reference light-ray wavelength of 550 nm.

14. The optical system set forth in claim 13, wherein:
said first layer is made from aluminum oxide by vacuum deposition;
said second layer is made from a mixture of titanium oxide and zirconium oxide by vacuum deposition;
said third layer is made from aluminum oxide by vacuum deposition; and
said fourth layer is made from magnesium fluoride by a sol-gel method.

15. The optical system set forth in claim 11 to be used for light rays in a wavelength range from 400 nm to 700 nm.

16. The optical system set forth in claim 11, and which is an imaging optical system.

17. The optical system set forth in claim 11, and which is a viewing optical system.

18. The optical system set forth in claim 11, wherein said anti-reflection coating includes a plurality of lower layers.

19. The optical system set forth in claim 11, wherein said optical surface is concave with respect to said aperture diaphragm.

20. An optical system comprising:
an aperture diaphragm; and
plural light transmitting members, including a plurality of lens elements, wherein:
at least one said light-transmitting member has an optical surface which is non-convex with respect to said aperture diaphragm;
an anti-reflection coating is provided on said optical surface;
said anti-reflection coating has a plurality of layers, including an upper layer having a refractive index equal to or smaller than 1.3, and at least one layer formed by vacuum deposition and located between said upper layer and said optical surface; and
for light rays in a wavelength range from 400 nm to 700 nm,
said optical surface where said anti-reflection coating is provided has:
a reflectance of 0.5% or less if said light rays are incident at angles within a range from 0 to 25 degrees, and
a reflectance of 3.5% or less if said light rays are incident at angles within a range from above 25 degrees to 60 degrees.

21. An optical system comprising:
an aperture diaphragm; and
plural light-transmitting members including a plurality of lens elements, at least one said light-transmitting member having an optical surface which is non-convex with respect to said aperture diaphragm,
said optical surface being provided with an anti-reflection coating having a magnesium fluoride layer formed by a sol-gel method and at least one layer formed by a vacuum deposition located between said optical surface and said magnesium fluoride layer, and
the following formula being satisfied:

$$0 \leq f/rs < 10.0$$

wherein "f" is a focal length, and "rs" is a radius of curvature for the optical surface with said anti-reflection coating, "rs" having a positive value (rs>0) if the optical surface is concave with respect to said aperture diaphragm.

22. The optical system set forth in claim 21, wherein said optical surface is concave with respect to said aperture diaphragm.

23. An optical system comprising:
an aperture diaphragm; and
plural light-transmitting members including a plurality of lens elements, at least one said light-transmitting member having an optical surface which is non-convex with respect to said aperture diaphragm,
said optical surface being provided with an anti-reflection coating having a magnesium fluoride layer with a refractive index equal to or smaller than 1.3 and at least one layer formed by a vacuum deposition located between said optical surface and said magnesium fluoride layer, and
the following formula being satisfied:

$$0 \leq f/rs < 10.0$$

wherein "f" is a focal length, and "rs" is a radius of curvature for the optical surface with said anti-reflection coating, "rs" having a positive value (rs>0) if the optical surface is concave with respect to said aperture diaphragm.

24. The optical system set forth in claim 23, wherein said optical surface is concave with respect to said aperture diaphragm.

25. A method for forming an image of an object, comprising:
providing an optical system having an aperture diaphragm and plural light-transmitting members including a plurality of lens elements,
wherein at least one said light-transmitting member has an optical surface which is non-convex with respect to said aperture diaphragm,
an anti-reflection coating is provided on said optical surface,
said anti-reflection coating includes an upper layer formed by a sol-gel method and at least one layer formed by vacuum deposition and located between said optical surface and said upper layer, and
the following formula is satisfied:

$$0 \leq f/rs < 10.0$$

wherein "f" is a focal length, and "rs" is a radius of curvature for the optical surface with said anti-reflection coating, "rs" having a positive value (rs>0) if the optical surface is concave with respect to said aperture diaphragm; and
forming an image of the object using said optical system.

26. The method system set forth in claim 25, wherein said optical surface is concave with respect to said aperture diaphragm.

27. A method of forming an image of an object, comprising:
providing an optical system having an aperture diaphragm and plural light-transmitting members including a plurality of lens elements,
wherein at least one said light-transmitting member has an optical surface which is non-convex with respect to said aperture diaphragm,
an anti-reflection coating is provided on said optical surface,
said anti-reflection coating includes an upper layer having a refractive index equal to or smaller than 1.3 and at least one layer formed by vacuum disposition and located between said optical surface and said upper layer, and
the following formula is satisfied:

$$0 \leq f/rs < 10.0$$

wherein "f" is a focal length, and "rs" is a radius of curvature for the optical surface with said anti-reflection coating, "rs" having a positive value (rs>0) if the optical surface is concave with respect to said aperture diaphragm; and
forming an image of the object using said optical system.

28. The method set forth in claim 27, wherein said optical surface is concave with respect to said aperture diaphragm.

29. A method of forming an image of an object, comprising:
- providing an optical system having an aperture diaphragm and plural light-transmitting members including a plurality of lens elements,
- wherein at least one said light-transmitting member has an optical surface which is non-convex with respect to said aperture diaphragm,
- an anti-reflection coating is provided on said optical surface,
- said anti-reflection coating includes a magnesium fluoride layer formed by a sol-gel method and at least one layer formed by vacuum deposition and located between said optical surface and said magnesium fluoride layer, and
- the following formula is satisfied:

$$0 \leq f/rs < 10.0$$

- wherein "f" is a focal length, and "rs" is a radius of curvature for the optical surface with said anti-reflection coating, "rs" having a positive value (rs>0) if the optical surface is concave with respect to said aperture diaphragm; and
- forming an image of the object using said optical system.

30. The method set forth in claim 29, wherein said optical surface is concave with respect to said aperture diaphragm.

31. A method of forming an image of an object, comprising:
- providing an optical system having an aperture diaphragm and plural light-transmitting members including a plurality of lens elements,
- wherein at least one said light-transmitting member has an optical surface which is non-convex with respect to said aperture diaphragm,
- an anti-reflection coating is provided on said optical surface,
- said anti-reflection coating includes a magnesium fluoride layer having a refractive index equal to or smaller than 1.3 and at least one layer formed by vacuum deposition and located between said optical surface and said magnesium fluoride layer, and
- the following formula is satisfied:

$$0 \leq f/rs < 10.0$$

- wherein "f" is a focal length, and "rs" is a radius of curvature for the optical surface with said anti-reflection coating, "rs" having a positive value (rs>0) if the optical surface is concave with respect to said aperture diaphragm; and
- forming an image of the object using said optical system.

32. The method set forth in claim 31, wherein said optical surface is concave with respect to said aperture diaphragm.

* * * * *